UNITED STATES PATENT OFFICE.

HOMER T. YARYAN, OF TOLEDO, OHIO.

PROCESS FOR THE TREATMENT OF FLAXSEED, &c.

SPECIFICATION forming part of Letters Patent No. 241,772, dated May 17, 1881.

Application filed April 15, 1881. (No specimens.)

*To all whom it may concern:*

Be it known that I, HOMER T. YARYAN, of Toledo, Lucas county, Ohio, have invented a new and useful Improvement in Process for the Treatment of Flaxseed, &c., of which the following is a specification.

In the extraction of oil from flaxseed by the use of a liquid solvent and the subsequent removal of the solvent with superheated steam I have found that when the seed in its natural condition is crushed sufficiently to obtain the best results in yield of oil the meal is so fine as to prevent rapid percolation, and in the subsequent introduction of superheated steam its fineness prevents the penetration of steam with ease into the mass. To avoid these difficulties and to loosen the oil from its cells I dampen the seed before crushing with water or steam. I have found by experience that the best results are obtained by dampening the seed sufficiently to cause the grain to swell and burst the oil-cells, then to pass the seed through a drier to remove the excess of moisture, and at the same time toughen the hull.

The drying may be done after the crushing of seed, or only a sufficient amount of moisture may be added as not to require drying; but the best results are as described above.

I am aware that for many years water and steam have been added to flaxseed after crushing in the process of extracting oil by pressure; but this I do not claim. My process applies only where a hydrocarbon solvent is used for extracting the oil by percolation. An apparatus for this purpose is described in Patent No. 205,328, issued to me June 25, 1878.

I claim as new—

The process which consists in adding water or steam to flaxseed before crushing or grinding, in combination with any process for extracting oil by percolation with a hydrocarbon solvent, for the purpose of facilitating the process of extracting the oil.

HOMER T. YARYAN.

Witnesses:
E. O. BROWN,
F. B. DODGE.